United States Patent [19]

Kramer et al.

[11] 4,116,483

[45] Sep. 26, 1978

[54] WINDOW FOR VEHICLE CABS, ESPECIALLY FOR VEHICLES EMPLOYED IN AGRICULTURE AND IN CONSTRUCTION

[75] Inventors: Peter Kramer, Troisdorf-Spich; Peter Buchholz, Cologne, both of Fed. Rep. of Germany

[73] Assignee: Klöckner-Humboldt-Deutz Aktiengesellschaft, Cologne, Fed. Rep. of Germany

[21] Appl. No.: 750,162

[22] Filed: Dec. 13, 1976

[30] Foreign Application Priority Data

Dec. 13, 1975 [DE] Fed. Rep. of Germany ....... 2556309

[51] Int. Cl.² .......................................... B62D 33/06
[52] U.S. Cl. ................................... 296/28 C; 49/402; 296/84 A
[58] Field of Search ................... 296/28 C, 146, 84 R, 296/84 A, 86, 92; 49/379, 402, 485

[56] References Cited

U.S. PATENT DOCUMENTS

| 2,032,630 | 3/1936 | Northrup | 296/92 |
| 2,157,366 | 5/1939 | Vigroux | 296/146 |
| 3,866,969 | 2/1975 | Sandrock | 296/146 |
| 4,007,958 | 2/1977 | Peifer | 296/28 C |

FOREIGN PATENT DOCUMENTS

| 719,119 | 11/1954 | United Kingdom | 296/84 R |
| 729,485 | 5/1955 | United Kingdom | 296/86 |

*Primary Examiner*—Joseph F. Peters, Jr.
*Assistant Examiner*—John A. Carroll
*Attorney, Agent, or Firm*—Walter Becker

[57] ABSTRACT

A window for vehicle cabs, especially for vehicles employed in agriculture and in the construction industry, which window is provided with a pane pivotally connected to the vehicle by two upper joints. The pane is at its sides by inner supporting members respectively and selectively held in opened and closed position. The joint members provided on the pane side are exclusively on the inner side of the pane bridged by a transverse yoke member which extends approximately over the upper length of the pane. The transverse yoke member is at its ends provided with lateral legs extending approximately half way down the pane. These legs are operatively engaged by the supporting members.

12 Claims, 4 Drawing Figures

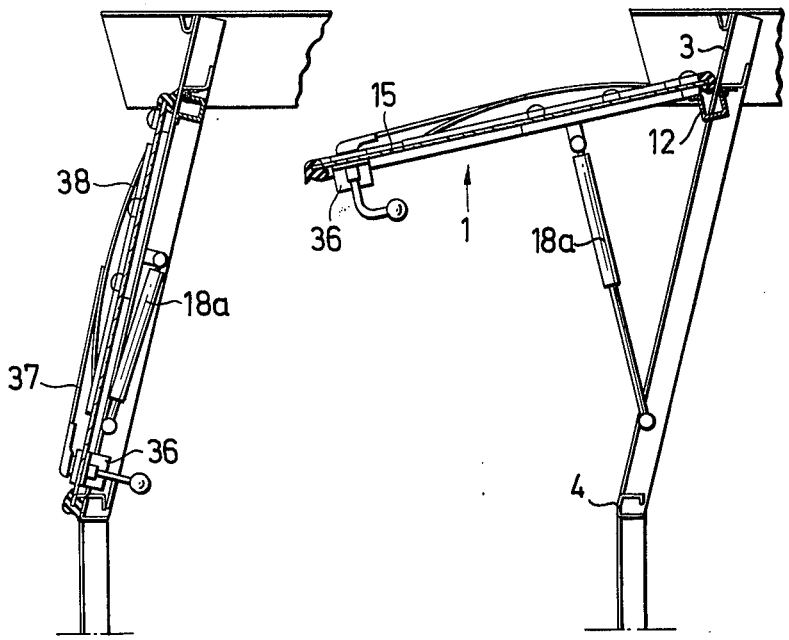
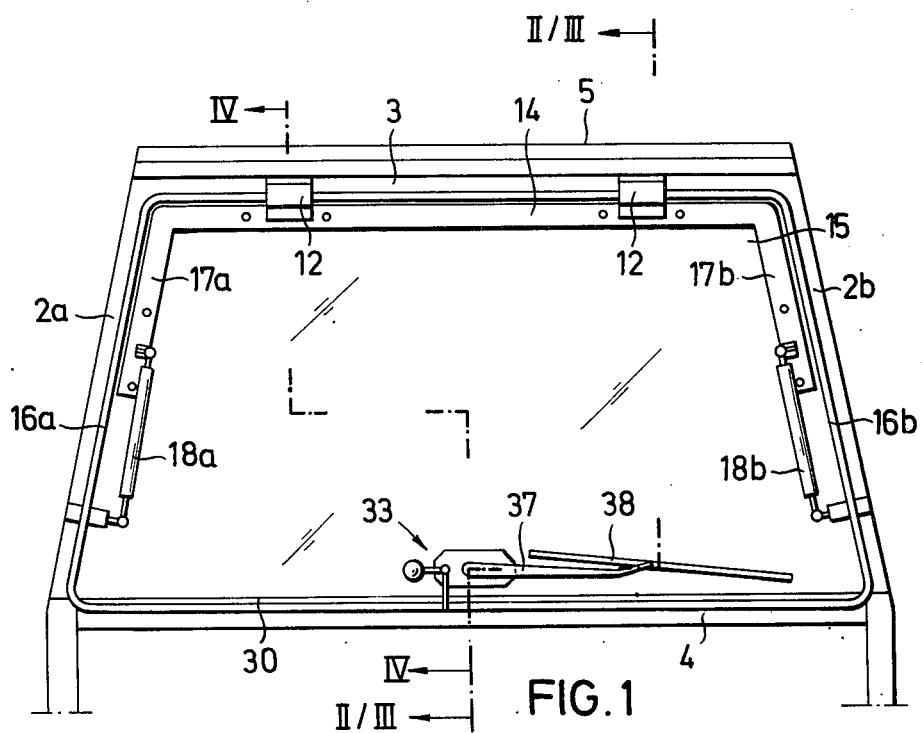

WINDOW FOR VEHICLE CABS, ESPECIALLY FOR VEHICLES EMPLOYED IN AGRICULTURE AND IN CONSTRUCTION

The present invention relates to a front or rear window for the cabs of agricultural and/or construction vehicles which is adapted to be pushed out and adjusted in the manner of awning-type windows and which comprises a window pane which is by means of two upper joints pivotally connected to the window frame and can be held in its open as well as in its closed position by means of a supporting member on each of its sides.

A front or rear window of the above mentioned type has been disclosed, for instance, in German Auslegeschrift No. 2,412,286 according to which the window pane does not have a frame and is connected exclusively to bands of upper hinges which bands extend downwardly beyond the first third portion of the pane. The bands arranged on the outer side of the pane are held to the pane through the intervention of rails extending parallel to each other and arranged on the inner side of the pane, the band and the rails being connected to each other by lower and upper screws while between the pane and the bands and the rails there are provided intermediate strip-shaped layers of elastic material. Such a design has the drawback that when driving over uneven terrain, the pane is subjected to inadmissible twisting stresses due to the twisting of the driver's cab which for tension technical reasons has been provided with a certain minimum twist. This known design furthermore requires that for tension technical reasons the pane is on both sides connected with the extended bands of the hinges. As a result thereof there is encountered the further drawback that the outwardly located bands have to be thoroughly protected against rust. Finally, this known arrangement also has the decisive drawback that in view of the selected type of connection of the window pane to its supporting members the suspension of the pane is not rattle-proof.

Based on these findings, it is an object of the present invention to improve a front or rear window of the above mentioned type in such a way that in particular with a driver's cab not rigidly connected to the respective vehicle there will be assured an economical and rattle-proof connection of the window pane to the upper hinges while the outside surface of the pane will be free from hinge members or the like.

This object and other objects and advantages of the invention will appear more clearly from the following specification in connection with the accompanying drawings, in which:

FIG. 1 shows a view of the window according to the invention as seen from the inside of the cab, the window being closed.

FIG. 2 is a cross section taken along the line II — II of FIG. 1.

FIG. 3 represents a cross section through the window according to the invention as shown in FIGS. 1 and 2 with the window in open condition.

Figure 4:
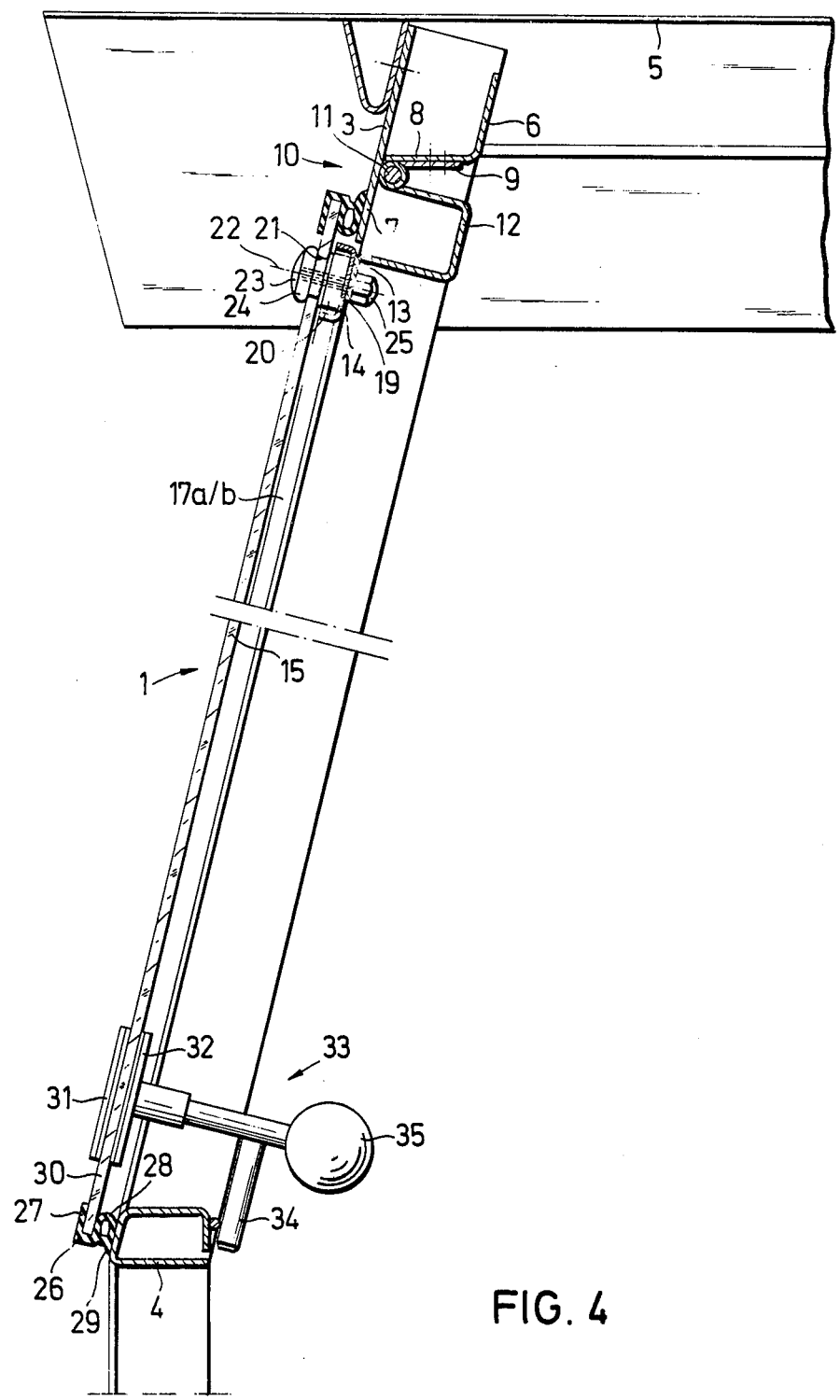
FIG. 4 illustrates on a larger scale than that of FIGS. 1–3 a cross section through the window according to the invention with the telescopic support being removed, said section being taken along the line IV — IV of FIG. 1.

The window according to the present invention is characterized primarily in that the members of the joint or hinge are provided exclusively on the inner side of the window pane and are bridged by a transverse yoke extending approximately over the upper part of the pane while the yoke comprises lateral legs provided at both sides of the pane and reaching approximately halfway down the pane, these legs having operatively connected thereto the supporting and adjusting means for the window.

This kind of connection of the pane to the associated joints or hinges brings about that with a minimum of material and a minimum of outwardly located metallic surfaces a pivotal connection of the window pane to the window frame is created which prevents a swinging through of the pane along its longitudinal and transverse axis.

For purposes of reducing the masses of the means serving as supporting elements for the window pane, the invention furthermore provides that the transverse yoke and its legs are formed of a U-profile open toward the pane and that the pane arranged in spaced relationship to the legs of the U-profile of the yoke is supported by the web of the U-profile by means of elastic intermediate members. In this way, especially with a rattle-proof connection of the pane to the supporting elements, it will be assured that no metallic pressure can be exterted by the supporting elements upon the pane itself. In this connection it is important for reasons of torsional stresses and for optical reasons that the lateral legs of the transverse yoke extend in spaced relationship and parallel to the lateral edges of the pane.

According to a further development of the invention it is provided that the transverse yoke and its lateral legs are connected exclusively to the pane by means of tensioning means equipped with spreading means. In this way a particularly economical connection is effected between the pane and the supporting elements therefor while only small masses are involved.

For a swing-proof connection of the spreading means with the pane it is furthermore provided according to the invention that between the spreading means and the pane there is arranged an elastic intermediate member. A tension-safe and relatively low cost connection of the pane to the transverse yoke and its legs is in this instance realized by the fact that the spreading means is designed as a screw extending through the transverse yoke or its legs. The screw is within the associated receiving bore of the pane covered by an elastic ring which preferably forms one piece with a collar portion projecting over the pane while the elastic ring and the projecting collar portion by means of the screw are connectable axially and radially to the pane.

In order to protect the outer edges of the pane against shocks and impacts and in order to protect the cab against moisture, particularly when the window is open, it is provided according to the invention that the outer rim of the pane is surrounded by a seal which comprises a sealing lip extending over the transverse yoke and its legs when the latter are adjusted in vertical position. To facilitate the closing of the window, it is expedient to arrange the sealing lip which extends over the transverse yoke and its legs on a hollow elastic body forming part of the seal.

According to a further feature of the invention it is suggested that the pane within the region of its frameless bottom side is on one or both sides connected to a bearing body of a locking device. In this way an advantageous dual purpose of the bearing body of the locking device is realized due to the fact that the bearing body may also serve as a holding means for a windshield wiper.

For protecting the mounting of the upper joints or hinges permitting the pivotal connection of the front or rear window, it is provided according to the invention that that structural part of the driver's cab which holds the stationary joint or hinge members is provided with a stationary projection which extends approximately over the upper width of the pane and is located above the stationary joint members and that the joint members on the side of the window pane are U-shaped while the lower arms of the joint members extend around the stationary projection when the window is open.

Referring now to the drawings in detail, the window 1 shown therein is arranged in an opening of a tractor cab defined by lateral frame members 2a, 2b, an upper transverse yoke 3 and a lower transverse yoke 4. The cab is provided with a roof 5. The upper transverse yoke 3 is preferably formed as a box-like part 6 by bending-over or as a rolled profile and has a downwardly extending web 7. To the lower arm 8 of the box-shaped part 6 of the upper transverse yoke 3 on both sides of the central longitudinal axis of the tractor there are linked stationary joint members 9 of a hinge 10. The stationary joint members 9 provided on both sides are by means of bolts 11 connected to a pivotable U-shaped joint member 12. The member 12 when occupying its FIG. 4 position into which it has been pivoted in counterclockwise direction, extends around the extended web 7 of the upper transverse yoke 3. In this way it is assured that none of the joint bearings formed by the bolts 11 in combination with the stationarily mounted pivotable joint members 9, 12 is directly exposed to inclement weather. The two pivotable joint members 12 are provided with a lower leg 13 each which are bridged by an upper pivotable transverse yoke 14 which is twist resistant. The transverse yoke 14 extends approximately over the upper width of a window pane 15 having rim sections or edges made of safety glass and at its ends is provided with downwardly directed legs 17a/b which extend parallel to the lateral edges 16a/b of the pane 15. The legs 17a/b extend about halfway down the width of the pane 15 and have their ends by means of hydraulic telescopic supports 18a, 18b, preferably provided with a gas spring, stationarily supported by the associated frame members 2a, 2b in such a way that when the window is closed they act upon the window in closing direction and when the window is open act upon the window in opening direction through the intervention of the legs 17a and 17b respectively.

To provide a particularly twist-resistant transverse yoke 14, the yoke 14 is similar to the legs 17a, 17b made of a U-shaped profile which is open toward the pane 15 and which may be produced, for instance, by stamping or swaging. To make the pane 15 rattle-proof, it is arranged in spaced relationship to the legs of the U-shaped profile of the transverse yoke 14 and to the legs 17a, 17b. In this connection the pane 15 rests on the web 19 of the U-shaped profile through the intervention of intermediate elastic discs 20 which may consist, for instance, of nylon or the like. As tensioning means between the transverse yoke 14 and its two legs 17a, 17b and the pane 15 there are provided cylindrical receiving bores 21 and screws 22 which extend through these bores 21 and which have an outer collar 23 and are surrounded by a hose-shaped rubber member or elastic ring 24. In relaxed position, the hose-shaped rubber members 24 are adapted to be passed through the receiving bores 21 and are by means of the screws 22 in cooperation with a nut 25 connectable to pane 15 radially as well as axially while between the pane and the collar 24 a bead is formed. In this way it will be assured that no rattling noise is transmitted to the cab from the pane 15 through the transverse yoke 14, legs 17a and 17b and the two joint members 12, and vice versa.

To prevent any breakage at the edges of the pane as it may occur when hard objects hit or impact upon the outer edges, the pane 15 is surrounded by a seal 26 of a U-shaped profile 27. That leg of the seal 26 which rests upon the frame legs 2a, 2b and on the two transverse yokes 3, 4 is designed as a hollow elastic body 28 with a sealing lip 29.

The pane 15 is in the center of its lower frameless side 30 on both sides connected to the bearing bodies 31, 32 of a locking device 33 for locking the front or rear window. The locking device 33 comprises a latch 34 mounted in the bearing body 31, 32. This latch 34 is provided with a handle 35. Furthermore, the motor and the control element of a windshield wiper arrangement 36 are screwed onto the inner bearing body 32 of the locking device 33. The windshield wiper arrangement 36 is on the outside of the window equipped with a wiper arm 37 and a wiper blade 38.

It is, of course, to be understood that the present invention is, by no means, limited to the specific showing in the drawings but also comprises any modifications within the scope of the appended claims.

What we claim is:

1. In combination: a motor vehicle cab having an upper frame member extending in the transverse direction of said cab, a lower frame member arranged in substantially parallel spaced relationship to said upper frame member, and two lateral frame members respectively arranged at the opposite ends of said upper and lower frame members and laterally interconnecting the same so as to define with each other and with said upper and lower frame members a substantially quadrangular window opening with the extension thereof in the transverse direction of said cab representing the length of said window opening and with the extension transverse to said length representing the width of said window opening; a window pane covering up said window opening and having an inner side facing toward the interior of said cab and having an oppositely located outer side facing away from the interior of said cab, said window pane having a first edge adjacent and substantially parallel to said upper frame member, a second edge opposite and substantially parallel to said first edge, and two lateral edges arranged opposite to each other and respectively extending from said first to said second edge; hinge means laterally spaced from each other and partly connected to said upper frame member and partly arranged on said inner side of said pane for hingedly connecting said window pane to said upper frame member; a yoke member bridging said hinge means and being connected thereto while being associated with and located exclusively only at said inner side along the first edge of said pane but in spaced relationship thereto, web means pivotally interconnecting said yoke member and said upper frame member relative to said hinge means, said yoke member having a longitudinal section arranged at and along said first edge while extending in the transverse direction of said cab, said yoke member also having lateral legs respectively arranged at said oppositely located lateral edges, said lateral legs having those ends thereof which are remote from said longitudinal section spaced from said second edge; and actuating means arranged between said second edge and said last mentioned legs and respectively connected to said legs and said lateral frame members.

2. The combination according to claim 1, in which said legs extend from the sides of said longitudinal yoke section in the direction toward and only approximately halfway to said second edge.

3. The combination according to claim 1, in which said longitudinal yoke section forms together with said lateral legs a U-profile, and which includes elastic insert means interposed directly between said pane and said longitudinal yoke section.

4. The combination according to claim 1, in which said lateral legs extend in spaced relationship to said lateral edges of said window pane.

5. The combination according to claim 1, which includes tensioning means and spreading means associated with said tensioning means, and in which said yoke member is connected to said pane solely by spreading means and said tensioning means.

6. The combination according to claim 5, which includes elastic insert means arranged between said spreading means and said pane.

7. The combination according to claim 5, in which said pane in the region of said yoke member is provided with bores, and in which said spreading means includes screw bolt means respectively extending through the bores from said outer side of said pane while being provided with a head outwardly spaced from said outer side, elastic compressible ring means surrounding said screw bolt means within the region of said bores and between said head and said outer side of said pane, and means associated with said screw bolt means for tightening said screw bolt means to firmly press said elastic compressible ring means between said head and said pane.

8. The combination according to claim 1, which includes sealing means around the outer edges of said pane and comprising sealing lip means for sealing engagement with said upper and lower frame members of said cab in closed position of said window pane.

9. The combination according to claim 8, in which said sealing means includes a hollow elastic body having said sealing lip means arranged thereon.

10. The combination according to claim 1, which includes latch means arranged within the region of said second edge of said pane for latching said pane in closing position to said lower frame member.

11. The combination according to claim 1, which includes holding means arranged on said window pane within periphery thereof, and windshield wiper means secured directly to said holding means.

12. The combination according to claim 1, in which said upper frame member has a downward extension having said hinge means interconnecting said upper frame and said web means, and in which said hinge means are U-shaped, one of the legs of said U-shaped hinge means downward extending around said extension in open position of said pane.

* * * * *